United States Patent [19]

Hefner, Jr.

[11] Patent Number: 4,680,378
[45] Date of Patent: Jul. 14, 1987

[54] CYANATE FUNCTIONAL MALEIMIDE AND POLYAMINE COPOLYMER

[75] Inventor: Robert E. Hefner, Jr., Lake Jackson, Tex.

[73] Assignee: The Dow Chemical Company, Midland, Mich.

[21] Appl. No.: 782,643

[22] Filed: Oct. 1, 1985

[51] Int. Cl.$^4$ .................. C08G 83/00; C08G 73/12
[52] U.S. Cl. .................................. 528/322; 526/262; 528/117; 528/170; 548/548
[58] Field of Search .................. 528/322, 170, 117; 526/262; 548/548

[56] References Cited

U.S. PATENT DOCUMENTS

| | | | |
|---|---|---|---|
| 3,491,060 | 1/1970 | Schminke et al. | 528/128 |
| 4,110,364 | 8/1978 | Gaku et al. | 528/170 |
| 4,371,689 | 2/1983 | Gaku et al. | 528/162 |
| 4,396,745 | 8/1983 | Ikeguchi | 525/374 |

OTHER PUBLICATIONS

*BT RESIN* (a technical bulletin by Mitsubishi Gas Chemical Company, Inc., Oct. 1, 1981).

*Primary Examiner*—Harold D. Anderson
*Attorney, Agent, or Firm*—James G. Carter

[57] ABSTRACT

Polymerizable compositions are disclosed which comprises a mixture of (A) at least one thermosettable compound which simultaneously contains both a maleimide group or substituted maleimide group and a cyanate group such as 3-(2,5-dihydro-2,5-dioxo-1H-pyrrol-1-yl)phenyl cyanate and (B) at least one material containing a plurality of aromatic amine groups such as 4,4'-diaminodiphenylmethane. Also disclosed are mixtures of the above polymerizable compositions and (C) at least one other material selected from (1) aromatic polycyanates, (2) polymaleimides, (3) materials having an average of more than one vicinal epoxide group per molecule, (4) a polymerizable ethylenically unsaturated material and (5) any combination thereof. The cured, polymerized products are useful as coatings, structural or electrical laminates or composites, castings, and the like.

4 Claims, No Drawings

CYANATE FUNCTIONAL MALEIMIDE AND POLYAMINE COPOLYMER

BACKGROUND OF THE INVENTION

This invention pertains to thermosettable compositions containing a compound which simultaneously contains both a maleimide group and a cyanate group and a polyamine.

Aromatic polycyanates which are thermosettable to polytriazines are known, for example, from U.S. Pat. Nos. 3,448,079; 3,553,244; 3,694,410; 3,740,348; 3,755,402; 4,094,852 and 4,097,455. Said polytriazines possess excellent heat resistance, however, their mechanical properties, especially tensile strength and elongation are deficient. Furthermore, there is substantial room for improvement in the reactivity of said polycyanates both in homopolymerizations and copolymerizations.

Copolymerization products of compounds containing two or more maleimide groups with compounds containing two or more cyanate groups and compounds containing two or more amino groups are known, for example, from U.S. Pat. Nos. 4,110,364; 4,371,689 and 4,396,745. Included within their teachings is the use of coprepolymers of bismaleimides and polyamines as well as the use of coprepolymers of aromatic polycyanates and polyamines. Preparation of said copolymerization products always requires premixing or contacting together of three separate components: the polycyanate compound, the polymaleimide compound and the polyamine compound. Furthermore, preparation of the aforesaid coprepolymers of bismaleimides and polyamines or aromatic polycyanates and polyamines is difficult to control and often leads to high molecular weight components which are difficult to use in the further copolymerization reaction due to low solubility and reduced processability.

The present invention alleviates the necessity to mix three separate components while still providing a copolymerizable mixture containing cyanate groups, maleimide groups and amino groups. This is accomplished by mixing a compound which simultaneously contains both a cyanate group and a maleimide group with an aromatic polyamine. As an additional benefit, the aforesaid copolymerizable mixture offers substantially enhanced reactivity over that of the compound which simultaneously contains both a cyanate group and a maleimide group alone.

SUMMARY OF THE INVENTION

One aspect of the present invention concerns a composition which comprises
(A) at least one thermosettable compound which simultaneously contains both a maleimide group and a cyanate group and
(B) at least one aromatic polyamine; wherein components (A) and (B) are present in a quantity which provides a mole ratio of amine to total maleimide and cyanate groups of about 0.001:1 to about 1:1.

Another aspect of the present invention concerns the product resulting from copolymerizing the aforesaid composition.

A further aspect of the present invention concerns a composition which comprises (A) at least one thermosettable compound which simultaneously contains both a maleimide group and a cyanate group;
(B) at least one aromatic polyamine; and
(C) at least one of
   (1) at least one aromatic polycyanate;
   (2) at least one polymaleimide;
   (3) at least one material having an average of more than one vicinal epoxide group per molecule; or
   (4) at least one polymerizable ethylenically unsaturated material;

wherein components (A) and (C) combined are present in any proportions so long as some quantity of each is present and the combination of components (A) and (C) comprise from about 0.1 to about 99.9, preferably from about b 50 to about 99.5 percent by weight of the combined weight of components (A), (B) and (C) and component (B) is present in an amount of from about 99.9 to about 0.1, preferably from about 0.5 to about 50 percent by weight of the combined weight of component (A), (B) and (C).

An additional aspect of the present invention concerns the product resulting from copolymerizing the aforementioned composition.

The term maleimide as employed herein includes substituted maleimides.

DETAILED DESCRIPTION OF THE INVENTION

Suitable compositions which simultaneously contain both a maleimide group and a cyanate group include, for example, those represented by the formulas

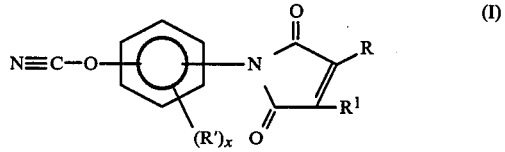

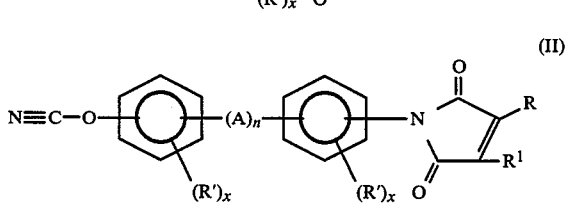

wherein each R and $R^1$ is independently hydrogen or a hydrocarbyl group having from 1 to about 3 carbon atoms; each R' is independently hydrogen, a hydrocarbyl or hydrocarbyloxy group having from 1 to about 10, preferably from 1 to about 4 carbon atoms, halogen, preferably chlorine or bromine; A is a divalent hydrocarbon group having from 1 to about 10, preferably from 1 to about 4 carbon atoms, —O—, —C—, —S—, —S—S—,
              ‖
              O

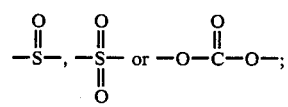

n has a value of zero or 1 and x has a value of 4.

The term hydrocarbyl as employed herein means any aliphatic, cycloaliphatic, aromatic, aryl substituted aliphatic or aliphatic substituted aromatic groups. Likewise, the term hydrocarbyloxy group means hydrocarbyl group having an oxygen linkage between it and the object to which it is attached.

Particularly suitable compositions which simultaneously contain both a maleimide group and a cyanate group include, for example, 4-(1-(3-(2,5-dihydro-2,5-dioxo-1H-pyrrol-1-yl)phenyl)-1-methylethyl)-phenyl cyanate; 4-(1-(4-(2,5-dihydro-2,5-dioxo-1H-pyrrol-1-yl)phenyl)-1-methylethyl)phenyl cyanate; 4-(1-(4-(2,5-dihydro-2,5-dioxo-1H-pyrrol-1-yl)phenyl)ethyl)phenyl cyanate; 4-(4-(2,5-dihydro-2,5-dioxo-1H-pyrrol-1-yl)phenoxy)phenyl cyanate; 4-((4-(2,5-dihydro-2,5-dioxo-1H-pyrrol-1-yl)phenyl)thio)phenyl cyanate; 4-(4-(2,5-dihydro-2,5-dioxo-1H-pyrrol-1-yl)benzoyl)phenyl cyanate; 4-((4-(2,5-dihydro-2,5-dioxo-1H-pyrrol-1-yl)phenyl)sulfonyl)phenyl cyanate; 4-(1-(4-(2,5-dihydro-3-methyl-2,5-dioxo-1H-pyrrol-1-yl)phenyl)-1-methylethyl)phenyl cyanate; 2,6-dibromo-4-(1-(3,5-dibromo-4-(2,5-dihydro-2,5-dioxo-1H-pyrrol-1-yl)phenyl)-1-methylethyl)phenyl cyanate; 4-(2,5-dihydro-2,5-dioxo-1H-pyrrol-1-yl)-3-methylphenyl cyanate; 4-(2,5-dihydro-2,5-dioxo-1H-pyrrol-1yl)phenyl cyanate and 3-(2,5-dihydro-2,5-dihydro-2,5-dioxo-1H-pyrrol-1-yl)phenyl cyanate.

The compositions which simultaneously contain both a maleimide group and a cyanate group can be prepared by reacting a stoichiometric quantity of a maleic anhydride per amine group of a hydroxy(amino)aryl or a hydroxyarylaminoaryl compound in the presence of a suitable solvent then cyanating the resulting hydroxyaryl maleimide product.

Suitable maleic anhydrides include, for example, those represented by the formula

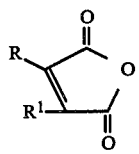

(III)

wherein R and R¹ are as hereinbefore defined.

Suitable maleic anhydrides include maleic anhydride, methyl maleic anhydride, mixtures thereof and the like. Most preferred as the maleic anhydride is maleic anhydride, per se.

Suitable hydroxy(amino)aryl and hydroxyarylaminoaryl compounds include, for example, those represented by the formulas

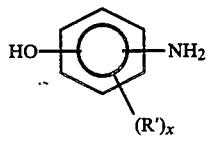

(IV)

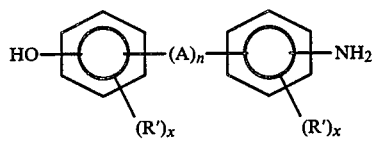

(V)

wherein R', A, n and x are as hereinbefore defined.

Suitable hydroxy(amino)aryl and hydroxyarylaminoaryl compounds include o-aminophenol; m-aminophenol; p-aminophenol; 2-methoxy-4-hydroxy-1-aminobenzene; 3,5-dimethyl-4-hydroxy-1-aminobenzene; 3-cyclohexyl-4-hydroxy-1-aminobenzene; 2,6-dibromo-4-hydroxy-1-aminobenzene; 5-butyl-4-hydroxy-1-aminobenzene; 3-phenyl-4-hydroxy-1-aminobenzene; 4-(1-(3-aminophenyl)-1-methylethyl)phenol; 4-(1-(4-aminophenyl)-1-methylethyl)phenol; 4-(1-(4-aminophenyl)ethyl)phenol; 4-(4-aminophenoxy)phenol; 4((4-aminophenyl)thio)phenol; (4-aminophenyl)(4-hydroxyphenyl)methanone; 4-((4-aminophenyl)sulfonyl)phenol and 4-(1-(4-amino-3,5-dibromophenyl)-1-methylethyl)-2,6-dibromophenol.

Specific methods for preparing 2-(4'-hydroxyaryl)-2-(4'-aminoaryl)propanes suitable for use as the hydroxyarylaminoaryl compound are taught by U.S. Pat. No. 4,374,272 which is incorporated herein by reference.

Suitable solvents include aliphatic monocarboxylic acids such as acetic acid, propionic acid, mixtures thereof and the like. Most preferred as the solvent is acetic acid. The maleamic acid resulting from reaction of a maleic anhydride and a hydroxy(amino)aryl or hydroxyarylaminoaryl compound, typically in an inert solvent such as chloroform, toluene or dioxane, may be isolated then dehydrated in an aliphatic monocarboxylic acid to the corresponding phenolic functional maleimide. Alternately, the reaction may be performed in a single continuous step in the aliphatic monocarboxylic acid solvent. The product resulting from this reaction is a phenolic functional maleimide represented by the formulas

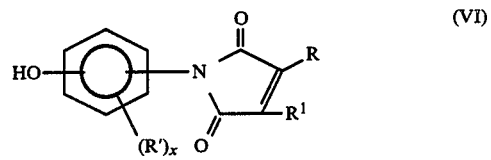

(VI)

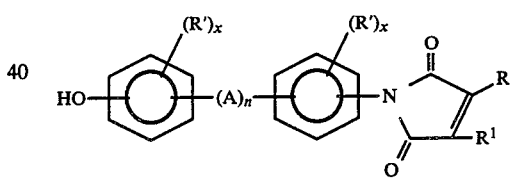

(VII)

wherein R, R¹, R', A, x and n are as hereinbefore defined.

Compounds which simultaneously contain both the maleimide group and the cyanate group are conveniently prepared by reacting a stoichiometric quantity or a slight stoichiometric excess (up to about 20 percent excess) of a cyanogen halide with a phenolic functional maleimide, such as those represented by formulas (VI) and (VII), in the presence of a stoichiometric quantity of a base material.

Suitable cyanogen halides include cyanogen bromide and cyanogen chloride. Alternately, the method of Martin and Bauer described in *Organic Synthesis*, Volume 61, pp. 35–68 (1983) and published by John Wiley and Sons can be used to generate the required cyanogen halide in situ from sodium cyanide and a halogen such as chlorine or bromine.

Suitable bases include both inorganic bases and tertiary amines such as sodium hydroxide, potassium hydroxide, triethylamine, mixtures thereof and the like. Most preferred as the base is triethylamine.

Suitable solvents include water, acetone, chlorinated hydrocarbons, ketones and the like. Most preferred solvents are acetone and methylene chloride. Reaction temperatures of from about −40° to about 60° C. are operable with temperatures of −20° to 25° C. being preferred.

Suitable materials having an average of more than one vicinal epoxy group per molecule which can be employed herein include, for example, the glycidyl ethers represented by the formulas polyglycidyl ether of a dicyclopentadiene and phenol condensation product and the like. The polyepoxides can be used either alone or in combination.

The aforementioned polyepoxides represented by formulas (VIII), (IX), (X), and (XI) can be prepared by reaction of a diphenol or polyphenol with an epihalohydrin and a basic acting material. Said reaction generally involves two distinct steps: coupling reaction of the

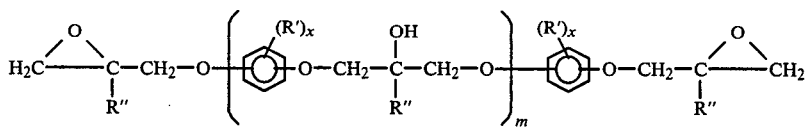
VIII.

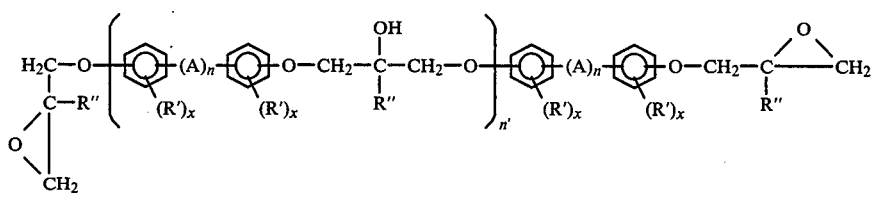
IX.

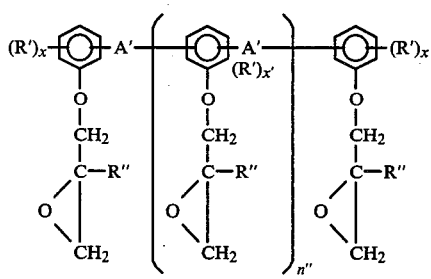
X.

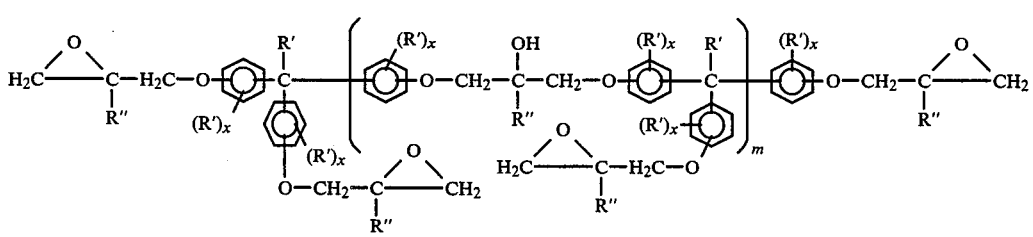
XI.

wherein A, R', x and n are as hereinbefore defined; each A' is independently a divalent hydrocarbon group having from 1 to about 6, preferably from 1 to about 4 carbon atoms or a

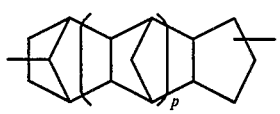

group; p has a value of from zero to about 10, preferably from zero to 3; each R" is independently hydrogen or an alkyl group having from 1 to about 4 carbon atoms; n' has a value of from about zero to about 30, preferably from about zero to about 5; n" has a value of from about 0.001 to about 6, preferably from about 0.01 to about 3 and x' has a value of 3.

Particularly suitable polyepoxides which can be employed herein include, for example, the diglycidyl ethers of resorcinol, bisphenol A, 3,3',5,5'-tetrabromobisphenol A, the triglycidyl ether of tris(hydroxyphenyl) methane, the polyglycidyl ether of a phenolformaldehyde condensation product (novolac), the epihalohydrin and diphenol or polyphenol to provide a halohydrin intermediate and dehydrohalogenation reaction of the halohydrin intermediate to provide the glycidyl ether product. Suitable catalysts and reaction conditions for preparing polyepoxides are described in the *Handbook of Epoxy Resins* by Lee and Neville, McGraw-Hill (1967) which is incorporated herein by reference.

Suitable aromatic polycyanates which can be employed herein include, for example, those represented by the formulas

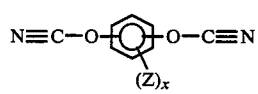
(XII)

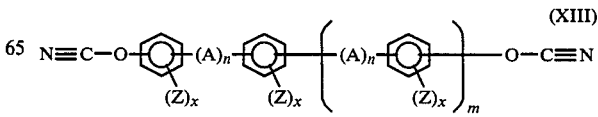
(XIII)

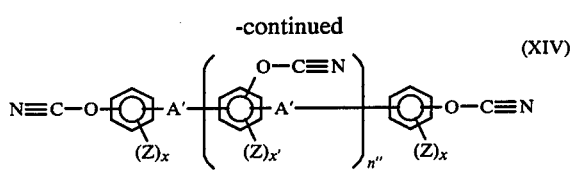

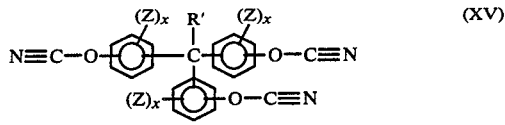

wherein each Z is independently hydrogen, a hydrocarbyl or hydrocarbyloxy group having from 1 to about 4 carbon atoms, chlorine, bromine, or a —O—C≡N group; m has a value of from zero to about 100, preferably from zero to about 10 and A, A', R', x, x', n, n" and p are as hereinbefore defined.

Suitable aromatic polycyanates represented by formulas (XII), (XIII), (XIV) and (XV) include, for example, bis-phenol A dicyanate, the dicyanates of 4,4'-dihydroxydiphenyl oxide, resorcinol, 4,4'-thiodiphenol, 4,4'-sulfonyldiphenol, 3,3',5,5'-tetrabromobisphenol A, 2,2',6,6'-tetrabromobisphenol A, 3-phenyl bisphenol A, 4,4'-dihydroxybiphenyl, 2,2'-dihydroxybiphenyl, 2,2',4,4'-tetrahydroxydiphenyl methane, 2,2',6,6'-tetramethyl-3,3',5,5'-tetrabromobisphenol A, 3,3'-dimethoxybisphenol A, the tetracyanate of 2,2'4,4'-tetrahydroxydiphenylmethane,

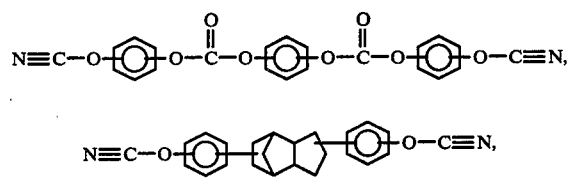

the tricyanate of tris(hydroxyphenyl)methane, the polycyanate of a phenolformaldehyde condensation product (novolac), the polycyanate of a dicyclopentadiene and phenol condensation product, and the like. The aromatic polycyanates may be used either alone or in any combination.

The aromatic polycyanates can be prepared by reacting a stoichiometric quantity or slight stoichiometric excess (up to about 20 percent excess) of a cyanogen halide with an aromatic polyphenol in the presence of a stoichiometric quantity of a base.

Suitable aromatic polyphenols include, for example, those represented by the formulas

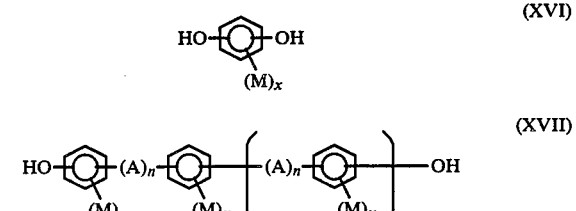

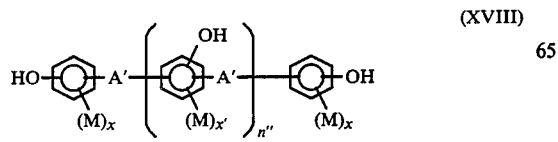

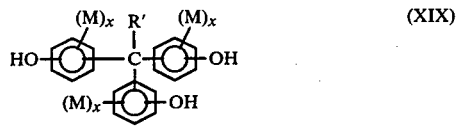

wherein A, A', R', x, x', n, n", m and p are as hereinbefore defined, and each M is independently a hydrocarbyl or hydrocarbyloxy group having from 1 to about 4 carbon atoms, chlorine, bromine, a phenyl group or a hydroxyl group.

Suitable cyanogen halides include cyanogen bromide and cyanogen chloride. Alternately, the method of Martin and Bauer described in *Organic Synthesis*, Volume 61, pp. 35–68 (1983) and published by John Wiley and Sons can be used to generate the required cyanogen halide in situ from sodium cyanide and a halogen such as chlorine or bromide.

Suitable bases include both inorganic bases and tertiary amines such as sodium hydroxide, potassium hydroxide, triethylamine, mixtures thereof and the like. Most preferred as the base is triethylamine.

Suitable solvents include water, acetone, chlorinated hydrocarbons, ketones, and the like. Most preferred solvents are acetone and methylene chloride.

Reaction temperatures of from about −40° to about 60° C. are operable with temperatures of −20° to 25° C. being preferred.

Suitable polymaleimides which can be employed herein include, for example, those represented by the formulas

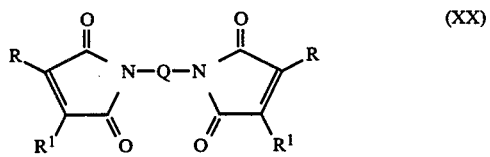

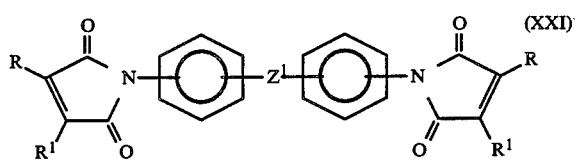

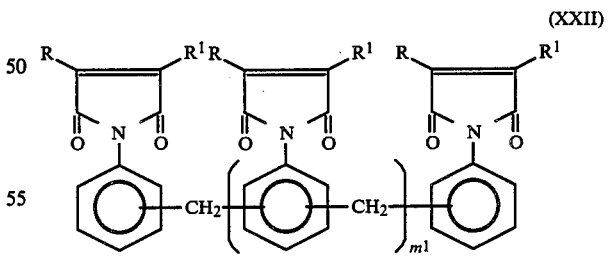

wheren R and $R^1$ are as hereinbefore defined; Q is a divalent hydrocarbyl group having from 2 to about 12 carbon atoms and $m^1$ has a value of 0.001 to about 10; $Z^1$ is a direct bond, a divalent hydrocarbyl group having from 1 to about 5 carbon atoms, $$-S-, -S-S-, -O-, -\overset{O}{\underset{}{S}}-, -\overset{O}{\underset{O}{S}}-, -\overset{O}{\underset{}{C}}- \text{ or}$$

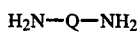

Typical polymaleimides represented by formulas XV, XVI and XVII include, N,N'-ethylenebismaleimide, N,N'-ethylenebis(2-methylmaleimide), N,N'-hexamethylenebismaleimide, N,N'-(oxydi-p-phenylene)bismaleimide, N,N'-(methylenedi-p-phenylene)bismaleimide, N,N'-(methylenedi-p-phenylene)bis(2-methylmaleimide), N,N'-(thiodi-p-phenylene)bismaleimide, N,N'-(sulfonyldi-m-phenylene)bismaleimide, N,N'-(isopropylidenedi-p-phenylene)bismaleimide, polymethylene polyphenylene polymaleimides and the like. The polymaleimides may be used either alone or in any combination.

The polymaleimides can be prepared by reacting a stoichiometric quantity of a maleic anhydride per amine group of a polyamine in the presence of a suitable solvent.

Suitable maleic anhydrides include those previously delineated herein.

Suitable polyamines which can be employed to prepare the polymaleimides include, for example, those represented by the formulas $$H_2N-Q-NH_2 \quad (XXIII)$$

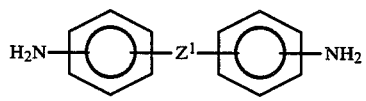

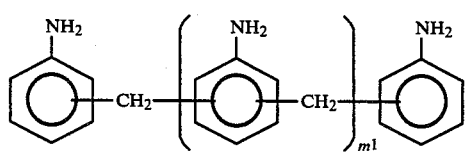

wherein Q, $Z^1$ and $m^1$ are as hereinbefore defined.

Suitable polyamines include 1,4-diaminobutane, dodecyl diamine, methylene dianiline, diaminodiphenyl ether, 2-methyl-4-ethyl-1,8-diaminooctane, anilineformaldehyde condensation products, mixtures thereof and the like.

Suitable solvents include aromatic hydrocarbons, chlorinated hydrocarbons, N,N-dimethylformamide and the like. Most preferred solvents are N,N-dimethylformamide, chloroform and toluene. The polymaleamic acid resulting from reaction of a maleic anhydride and a polyamine may be isolated then dehydrated to the desired polymaleimide. Alternately, the reaction may be performed in a single continuous step. Detailed procedures for preparing polymaleimides can be found in U.S. Pat. No. 2,444,536 and U.S. Pat. No. 2,462,835 which are incorporated herein by reference.

Suitable polymerizable ethylenically unsaturated materials which can be employed herein include those represented by the formula

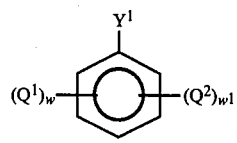

wherein each $Q^1$ is independently hydrogen, a hydrocarbyl or hydrocarbyloxy group having from 1 to about 4 carbon atoms, a vinyl group, an allyl group, chlorine or bromine; each $Q^2$ is independently hydrogen or a hydrocarbyl or hydrocarbyloxy group having from 1 to about 4 carbon atoms; $Y^1$ is

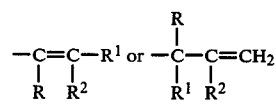

wherein each R, $R^1$ and $R^2$ is independently hydrogen or a hydrocarbyl group having from 1 to about 3 carbon atoms; and w and $w^1$ are each positive integers, the sum of which is 5.

Typically ethylenically unsaturated compounds represented by formula XXVI include, for example, styrene, alpha-methylstyrene, chlorostyrene, bromostyrene, t-butylstyrene, p-methylstyrene, p-methoxystyrene, divinylbenzene, propylstyrene, chloro-alpha-methylsytrene, m-methylstyrene, o-methylstyrene, allylbenzene, methallylbenzene, p-allylstyrene, diallylbenzene, mixtures thereof and the like.

Equally preferred as the polymerizable ethylenically unsaturated material which can be employed include herein the acrylate esters represented by the formula

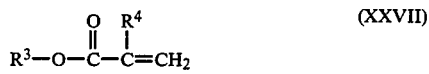

wherein $R^3$ is a hydrocarbyl group having from 2 to about 25 carbon atoms and may be branched, cyclic or polycyclic and $R^4$ is hydrogen or a methyl group.

Typical acrylate esters represented by formula XXVII include ethyl acrylate, n-butyl acrylate, n-butyl methacrylate, sec-butyl acrylate, 2-ethylhexyl acrylate, 2-ethylhexyl methacrylate, n-dodecyl acrylate, cyclohexyl acrylate, methyl cyclohexyl acrylate, norbornyl acrylate, dicyclopentadiene acrylate, methyl dicyclopentadiene acrylate, mixtures thereof and the like.

Although less preferred, any other of the known polymerizable ethylenically unsaturated compounds can be employed herein either alone or in any combination. Typical of these compounds are acrylonitrile, diallylphthalate, vinyl chloride, vinyl bromide, vinyl acetate, vinyl naphthalene, the poly(ethoxy)acrylate of dicyclopentadiene, mixtures thereof and the like.

Suitable aromatic polyamines which are employed herein include, for example, those represented by formulas XXV,

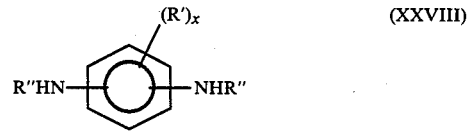

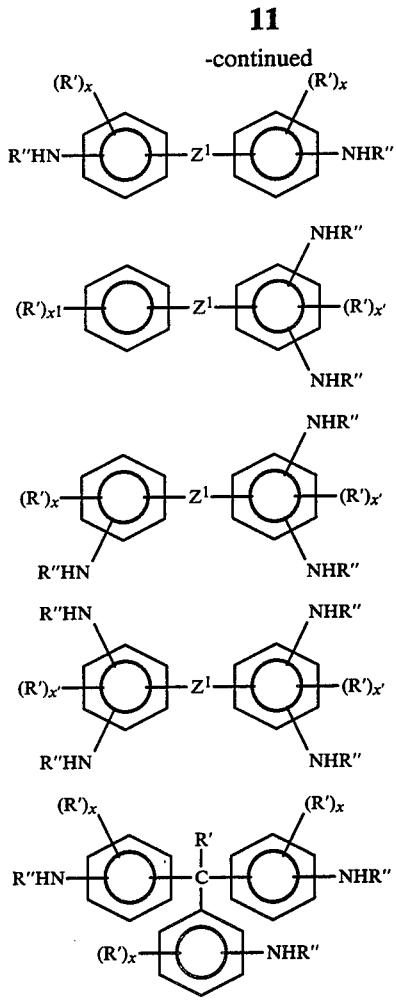

wherein $Z^1$, R', R'', x, x' are as hereinbefore defined and $x^1$ has a value of 5.

Suitable polyamines include methylenedianilines, diaminobenzenes, 2,2',4,4'-tetraaminodiphenylmethane, 4,4'-diaminodiphenyloxide, tris(aminophenyl)methane, anilineformaldehyde condensation products, mixtures thereof and the like.

Compositions which comprise at least one thermosettable compound which simultaneously contains both a maleimide group and a cyanate group (Formulas I, II) and at least one aromatic polyamine (Formulas XXV, XXVIII, XXIX, XXX, XXXI, XXXII, XXXIII) may be cured (copolymerized) by heating from 50° to about 350° C. or more, preferably by heating from 70° to 200° C. and optionally in the presence of 0.001 to 5 percent by weight of a suitable cyclization catalyst. Operable cyclization catalysts include those taught by U.S. Pat. Nos. 3,694,410 and 4,094,852. Most preferred cyclization catalysts are cobalt naphthenate and cobalt octoate. The quantity depends upon the particular cyclization catalyst, cure time, cure temperature and structure of the specific compound being cured.

Prepolymerization or B-staging of the compositions can be accomplished by using lower temperatures and/or shorter curing times. Curing of the thus formed prepolymerized or B-staged resin can then be completed at a later time or immediately following prepolymerization or B-staging by increasing the temperature and/or curing time.

The cured (copolymerized) products prepared from at least one thermosettable compound which simultaneously contain both a maleimide group and a cyanate group and at least one aromatic polyamine can posses a complex variety of curing structures including the cyanate group homopolymerization structure

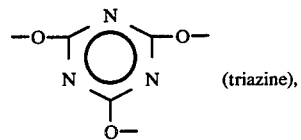 (triazine), the maleimide group homopolymerization structure

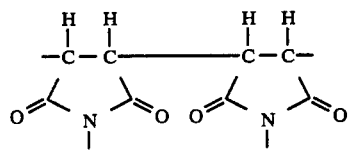

the cyanate group and amine group copolymerization structure

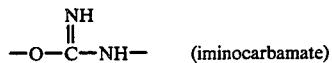 (iminocarbamate)

the maleimide group and amine group copolymerization structure

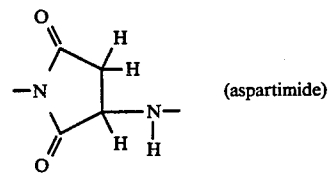 (aspartimide)

and cyanate group and maleimide group copolymerization structures such as, for example

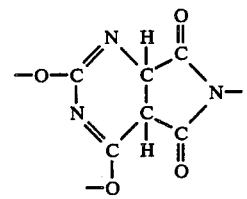

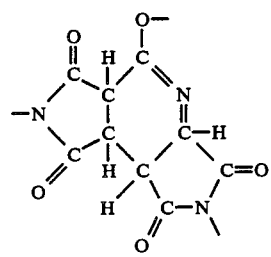

Minor amounts of other curing structures, may also be present.

Compositions which comprise at least one thermosettable compound which simultaneously contains both a maleimide group and a cyanate group (I, II) and an aromatic polyamine (formulas XXV, XXVIII, XXIX, XXX, XXXI, XXXII, XXXIII) and at least one compound selected from the group consisting of an aromatic polycyanate, (XII, XIII, XIV, XV), a polymaleimide (XX, XXI, XXII), a polyepoxide (VIII, IX, X, XI) or a polymerizable ethylenically unsaturated material (XXVI, XXVII) may be cured (copolymerized) by heating from 50° to about 350° C. or more, preferably from 70° to 200° C. and, optionally, in the presence of 0.001 to 5 percent of a suitable cyclization catalyst and, optionally, 0.001 to 3 percent of a suitable free radical forming catalyst.

Suitable cyclization catalysts include those previously delineated herein while suitable free radical forming catalysts include the organic peroxides, hydroperoxides, azo compounds and diazo compounds. Most preferred free radical forming catalysts include t-butyl peroxybenzoate, azobisiosbutyronitrile, dicumylperoxide and di-t-butylperoxide. The quantity depends upon the particular free radical forming catalyst, cure temperature, cure time and the particular compounds being copolymerized.

Prepolymerization or B-staging of the compositions can be accomplished as was previously described.

The cured (copolymerized) products possess a complex variety of curing structures which depend, in part, upon the amounts and types of compounds being copolymerized, cure time, cure temperature, presence or absence of a cyclization catalyst, presence or absence or a free radical forming catalyst and other known variables.

Compositions which contain at least one thermosettable compound which simultaneously contains both a maleimide group and a cyanate group (I, II) and an aromatic polyamine (XXV, XXVIII, XXIX, XXX, XXXI, XXXII, XXXIII) and either an aromatic polycyanate (XII, XIII, XIV, XV) or a polymaleimide (XX, XXI, XXII) or both can copolymerize to produce the aforementioned curing structures delineated for thermosettable compounds which simultaneously contain both a maleimide group and a cyanate group. It should be noted, however, that the relative mole ratio of cyanate groups to maleimide groups can influence the amounts of the various curing structures in the cured product. For example, a large excess of cyanate groups, provided by using an aromatic polycyanate in the copolymerizable composition, increases the amount of triazine curing structure in the cured product. Similarly, increasing the mole ratio of amine groups to cyanate and maleimide groups in the copolymerizable composition, increases the amount of iminocarbamate and aspartimide curing structures in the cured product.

Compositions which contain at least one thermosettable compound which simultaneously contains both a maleimide group and a cyanate group (I, II) and an aromatic polyamine (XXV, XXVIII, XXIX, XXX, XXXI, XXXII, XXXIII) and a polyepoxide (VIII, IX, X, XI) possess complex curing structures including those derived from copolymerization reaction of the cyanate group and the glycidyl ether group

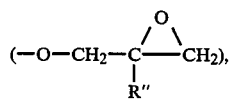

as well as from copolymerization reaction of the glycidyl ether group and amine group.

Compositions which contain at least one thermosettable compound which simultaneously contains both a maleimide group and a cyanate group (I, II) and an aromatic polyamine (formulas XXV, XXVIII, XXIX, XXX, XXXI, XXXII, XXXIII) and a polymerizable ethylenically unsaturated material (XXVI, XXVII) can possess curing structures derived from copolymerization reaction of the maleimide group and the polymerizable ethylenically unsaturated group, from copolymerization reaction of the maleimide group and the cyanate group, from copolymerization reaction of the cyanate group and the polymerizable ethylenically unsaturated group, from copolymerization reaction of the maleimide group and the amine group, as well as from copolymerization reaction of the cyanate group and the amine group. Additionally present may be curing structures derived from homopolymerization of the polymerizable ethylenically unsaturated groups, from homopolymerization of the maleimide groups, as well as from homopolymerization of the cyanate groups.

The terms homopolymerization and copolymerization are also meant to include both dimerization and oligomerization.

The compositions which comprise at least one thermosettable compound which simultaneously contains both a maleimide group and a cyanate group (formulas I, II) and an aromatic polyamine (formulas XXV, XXVIII, XXIX, XXX, XXXI, XXXII, XXXIII) and at least one compound from the group consisting of an aromatic polycyanate (formulas XII, XIII, XIV, XV), a polymaleimide (formulas XX, XXI, XXII), a polyepoxide (formulas VIII, IX, X, XI) or a polymerizable ethylenically unsaturated material (formulas XXVI, XXVII) may be copolymerized either simultaneously or in stages.

In a preferred process of the present invention, a thermosettable compound which simultaneously contains both a maleimide group and a cyanate group (formulas I, II) and a polymerizable ethylenically unsaturated material are first copolymerized in the presence of 0.001 to 2 percent of a suitable free radical forming catalyst and at a suitable reaction temperature while in solution in an aromatic polycyanate (formulas XII, XIII, XIV, XV). Operable free radical forming catalysts are as hereinbefore described. Suitable reaction temperatures are from about 65° C. to about 125° C. The compound which simultaneously contains both a maleimide group and a cyanate group and the polymerizable ethylenically unsaturated material may first be mixed to form a solution which is then added to the polycyanate. Alternately, the polymerizable ethylenically unsaturated material may be added to a solution of the compound which simultaneously contains both a maleimide group and a cyanate group and the polycyanate. The product resulting from this copolymerization is a copolymer of the polymerizable ethylenically unsaturated material with the maleimide groups of the compound which simultaneously contains both a maleimide group and a cyanate group dissolved in or mixed with a polycyanate. This product is then combined with an aromatic diamine (formulas XXV, XXVIII, XXIX, XXX, XXXI, XXXII, XXXIII) then the product may be cured (copolymerized) as previously described herein or copolymerized, for example, with a polyepoxide, as previously described herein. It is especially preferred to utilize the polyamine component in an amount of about 1 to 15 percent by weight of the total weight of the copolymerizable mixture when high reactivity (fast gel time) is desired.

As a specific example, copolymerization of styrene and 3-(2,5-dihydro-2,5-dioxo-1H-pyrrol-1-yl)phenyl cyanate in the presence of a free radical forming catalyst while in solution in bisphenol A dicyanate provides a copolymer of the following structure dissolved in or mixed with the bisphenol A dicyanate:

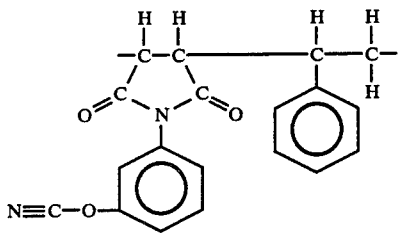

Depending on the amounts of the styrene and 3-(2,5-dihydro-2,5-dioxo-1H-pyrrol-1-yl)phenyl cyanate used, significant amounts of homopolymer of either of the aforementioned compounds may also be present. Addition of the polyamine component followed by curing results in a copolymer containing triazine and/or iminocarbamate curing structures.

In another preferred process of the present invention, a thermosettable compound which simultaneously contains both a maleimide group and a cyanate group (I, II) and a polymerizable ethylenically unsaturated material are copolymerized in the presence of 0.001 to 3 percent of a suitable free radical forming catalyst and at a suitable reaction temperature optionally in the presence of an inert solvent. The product resulting from this copolymerization is a copolymer of the ethylenically unsaturated material with the maleimide groups of the compound which simultaneously contains both a maleimide group and a cyanate group. Addition of the polyamine component followed by curing results in a copolymer containing triazine and/or iminocarbamate curing structures.

As a specific example, styrene and 3-(2,5-dihydro-2,5-dioxo-1H-pyrrol-1-yl)phenyl cyanate are copolymerized to provide a copolymer of the following structure:

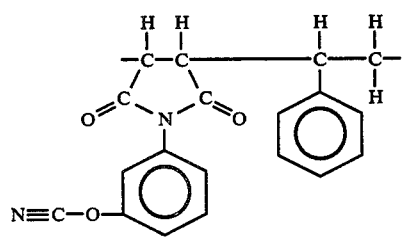

Addition of stoichiometric methylenedianiline followed by curing converts the thermoplastic copolymer to a (crosslinked) thermoset copolymer of the following structure:

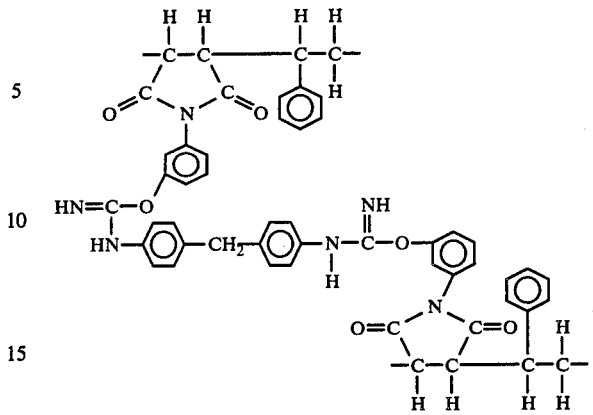

In those instances where R' is chlorine or bromine (formulas I, II, VIII, IX, X, XI, XV, XXVIII, XXIX, XXX, XXXI, XXXII, XXXIII); Z is chlorine or bromine (formulas XII, XIII, XIV, XV) and/or $Q^1$ is chlorine or bromine (formula XXVI) the halogen(s) are incorporated into the copolymers by the polymerization of monomer(s) containing said group(s). Furthermore, the halogen groups can be incorporated into the copolymers in a specific location within the polymer structure. As a specific example, copolymerization of 3-(2,5-dihydro-2,5-dioxo-1H-pyrrol-1-yl)phenyl cyanate and 3,3',5,5'-tetrabromo-4,4'-diaminodiphenylmethane provides a copolymer wherein R' is bromine and R' is specifically present only on the aromatic rings derived from diaminodiphenylmethane within the polymer chaings. Said halogen containing copolymers are useful as fire retardant polymers.

If desired, the compositions can contain fillers, pigments, dyes, reinforcing materials, other additives and the like.

The compositions of the present invention are useful in the preparation of castings, structural or electrical laminates or composites, coatings, and the like. Because of their high reactivity, many of the compositions of the present invention are well suited to rapid processing methods, for example, reactive injection molding (RIM).

Laminates or composites can be prepared from the compositions of the present invention employing any facing and/or reinforcing materials such as, for example, metallic sheets, woven or mat materials, such as fiberglass, graphite, asbestos, aramids, carbon combinations thereof and the like.

The following examples are illustrative of the invention but are not to be construed as to limiting the scope thereof in any manner.

EXAMPLE 1

A. Synthesis of a Phenolic Functional Maleimide

A 54.57 gram portion of m-aminophenol (0.50 mole) and 1000 milliliters of acetic acid were added to a reactor and maintained under a nitrogen atmosphere with stirring. The stirred solution was maintained at 25° C., then 49.03 grams of maleic anhydride (0.50 mole) dissolved in 100 milliliters of acetic acid was added to the reactor and heating to 115° C. commenced. The 115° C. reaction temperature was maintained for 18 hours (64,800 s), then the product was dried under vacuum by rotary evaporation at 120° C. for 30 minutes (1800 s) to a dark brown solid. The crude product was extracted with two 250 milliliter portions of o-dichlorobenzene at 120° C. The combined extracts were maintained at 2° C. for 24 hours (86,400 s) then the light yellow orange colored crystalline product was recovered by filtration and dried under vacuum at 60° C. for 24 hours (86,400 s) to provide 23.1 grams of N-(3-hydroxyphenyl)maleimide. Infrared spectrophotometric analysis of a film sample, nuclear magnetic resonance spectroscopy and mass spectroscopy (m/Z=214) all confirmed the product structure.

B. Preparation of 3-(2,5-dihydro-2,5-dioxo-1H-pyrrol-1-yl)phenyl cyanate

A 15.80 gram portion of N-(3-hydroxyphenyl)maleimide (0.0835 mole), 9.29 grams of cyanogen bromide (0.0877 mole) and 300 milliliters of acetone were added to a reactor and maintained under a nitrogen atmosphere with stirring. The stirred solution was cooled to −5° C. then 8.50 grams of triethylamine (0.0840 mole) was added to the reactor over a ten minute (600 s) period and so as to maintain the reaction temperature at −5° to −3° C. After completion of the triethylamine addition, the reactor was maintained at −5° to −3° C. for an additional forty minutes (2400 s), followed by addition of the reactor contents to 1500 milliliters of deionized water. After five minutes (300 s), the water and product mixture was multiply extracted with three 100 milliliter volumes of methylene chloride. The combined methylene chloride extract was washed with 1000 milliliters of deionized water followed by a second deionized water washing with 500 milliliters of deionized water then drying over anhydrous sodium sulfate. The dry methylene chloride extract was filtered and solvent removed by rotary evaporation under vacuum for 30 minutes at 100° C. 3-(2,5-dihydro-2,5-dioxo-1H-pyrrol-1-yl)phenyl cyanate (16.2 grams) was recovered in 90.6 percent yield as a light tan colored powder. Infrared spectrophotometric analysis of a film sample of the product confirmed the product structure (disappearance of phenolic hydroxyl absorbance, appearance of cyanate absorbance at 2232 and 2274 cm$^{-1}$, maintenance of maleimide carbonyl absorbance at 1714 cm$^{-1}$).

C. Copolymerization of 3-(2,5-dihydro-2,5-dioxo-1H-pyrrol-1-yl)phenyl cyanate and 4,4'-diaminodiphenylmethane A 0.10 gram portion of 3-(2,5-dihydro-2,5-dioxo-1H-pyrrol-1-yl)phenyl cyanate and 0.10 gram of 4,4'-diaminodiphenylmethane were thoroughly mixed to provide a homogeneous blend. A 9.2 milligram portion of the powder blend was copolymerized and simultaneously analyzed for cure kinetics using differential scanning calorimetry (DSC). A scanning rate of 10° C. per minute (0.167° C./s) was used under a nitrogen stream flowing at 35 cubic centimeters per minute (0.58 cc/s). The results are reported in Table I.

TABLE I

| Event (°C.) | Heat of Reaction-ΔH exotherm (mJ) | Specific Heat of Reaction-ΔH (J/G) | Activation Energy (kJ/mole) | Reaction Order |
|---|---|---|---|---|
| exotherm (93.8) | 2093 | 227 | 44.8 ± 16.7 | 1.10 ± 0.4 |
| exotherm (253) | 542 | 59 | 81.5 ± 15.6 | 0.82 ± 0.2 |

COMPARATIVE EXPERIMENT A

Homopolymerization of 3-(2,5-dihydro-2,5-dioxo-1H-pyrrol-1-yl)phenyl cyanate

A 9.1 milligram portion of 3-(2,5-dihydro-2,5-dioxo-1H-pyrrol-1-yl)phenyl cyanate was homopolymerized and simultaneously analyzed for cure kinetics by DSC using the method of Example 1-C. The results are reported in Table II.

TABLE II

| Event (°C.) | Heat of Reaction-ΔH exotherm (mJ) | Specific Heat of Reaction-ΔH (J/G) | Activation Energy (kJ/mole) | Reaction Order |
|---|---|---|---|---|
| exotherm (188) | 4154 | 392 | 98.4 ± 2.6 | 1.14 ± 0.03 |
| exotherm (293) | 496 | 47 | 118.3 ± 15.5 | 1.13 ± 0.13 |

EXAMPLE 2

Stroke Cure of 3-(2,5-dihydro-2,5-dioxo-1H-pyrrol-1-yl)phenyl cyanate and 4,4'-diaminodiphenylmethane mixtures Portions of 3-(2,5-dihydro-2,5-dioxo-1H-pyrrol-1-yl)phenyl cyanate and 4,4'-diaminodiphenylmethane were thoroughly mixed to provide homogeneous blends. The resulting powder blends were applied to a constant temperature hot plate and a timer was started as soon as the sample had totally melted. The melted sample was stroked with a spatula using a smooth back and forth motion. The gel point was considered as that time when strands or filaments could no longer be pulled up from the sample by the spatula. The results are reported in Table III.

COMPARATIVE EXPERIMENT B

Portions of 3-(2,5-dihydro-2,5-dioxo-1H-pyrrol-1-yl)phenyl cyanate were applied to a constant temperature hot plate and subjected to stroke cure using the method of Example 2. The results are reported in Table III.

TABLE III

| Composition of Powder Blend | | | |
|---|---|---|---|
| 3-(2,5-dihydro-2,5-dioxo-1H—pyrrol-1-yl)phenyl cyanate (grams) | 4,4'-diaminodiphenyl-methane (grams) | Temperature (°C.) | Time to Gel Point (sec.) |
| 0.10 | 0.10 | 125 | 149 |
| 0.18 | 0.02 | 125 | 16.8, 15.7 |
| *0.20 | none | 125 | >1000 |
| 0.10 | 0.10 | 177 | 68 |
| *0.20 | none | 177 | >1000 |
| *0.20 | none | 200 | 742 |

*Comparative experiment, not an embodiment of the present invention.

EXAMPLE 3

Stroke Cure of 3-(2,5-dihydro-2,5-dioxo-1H-pyrrol-1-yl)phenyl cyanate, bisphenol A dicyanate and 4,4'-diaminodiphenylmethane mixtures Portions of 3-(2,5-dihydro-2,5-dioxo-1H-pyrrol-1-yl)phenyl cyanate (10 percent by weight) and bisphenol A dicyanate (90 percent by weight) were heated with stirring to 125° C. to provide a homogeneous molten solution. The solution was cooled to provide a homogeneous crystalline solid portions of which were then mixed with 4,4'-diaminophenylmethane to provide homogeneous powder blends. The resulting powder blends were evaluated for stroke cure using the method of Example 2. The results are reported in Table IV.

COMPARATIVE EXPERIMENT C

A portion of the 3-(2,5-dihydro-2,5-dioxo-1H-pyrrol-1-yl)phenyl cyanate and bisphenol A dicyanate mixture of Example 2 was evaluated for stroke cure using the method of Example 2. The results are reported in Table IV.

TABLE IV

| Composition of Powder Blend | | | |
|---|---|---|---|
| 3-(2,5-dihydro-2,5-dioxo-1H—pyrrol-1-yl)phenyl cyanate (grams) | 4,4'-diaminodiphenylmethane (grams) | Temperature (°C.) | Time to Gel Point (sec.) |
| 0.09 | 0.01 | 75 | 104 |
| 0.09 | 0.01 | 125 | 16.3 |
| 0.09 | 0.01 | 177 | 5.5 |
| *0.10 | none | 177 | 915 |

*Comparative experiment, not an embodiment of the present invention.

I claim:

1. A polymerizable or curable composition which comprises
   (A) at least one thermosettable compound which simultaneously contains in the same molecule only one maleimide group or substituted maleimide group which group is represented by the formula

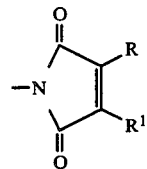

wherein each R and $R^1$ is independently hydrogen or a hydrocarbyl group having from 1 to about 3 carbon atoms; and only one cyanate group; and
   (B) at least one material containing a plurality of aromatic amine groups; and
   components (A) and (B) are present in a quantity which provides a mole ratio of amine to total maleimide, substituted maleimide and cyanate groups of from about 0.001 to about 1:1.

2. A polymerizable or curable composition of claim 1 wherein component (A) is 3-(2,5-dihydro-2,5-dioxo-1H-pyrrol-1-yl)phenyl cyanate, 4-(1-(4-(2,5-dihydro-2,5-dioxo-1H-pyrrol-1-yl)phenyl cyanate or a mixture thereof; and component (B) is 4,4'-diaminodiphenylmethane.

3. A composition which results from polymerizing or curing a composition of claim 1.

4. A composition which results from polymerizing or curing a composition of claim 2.